(No Model.)
G. A. O'NEILL.
TESTING DEVICE FOR ELECTRIC CIRCUITS.
No. 523,865. Patented July 31, 1894.
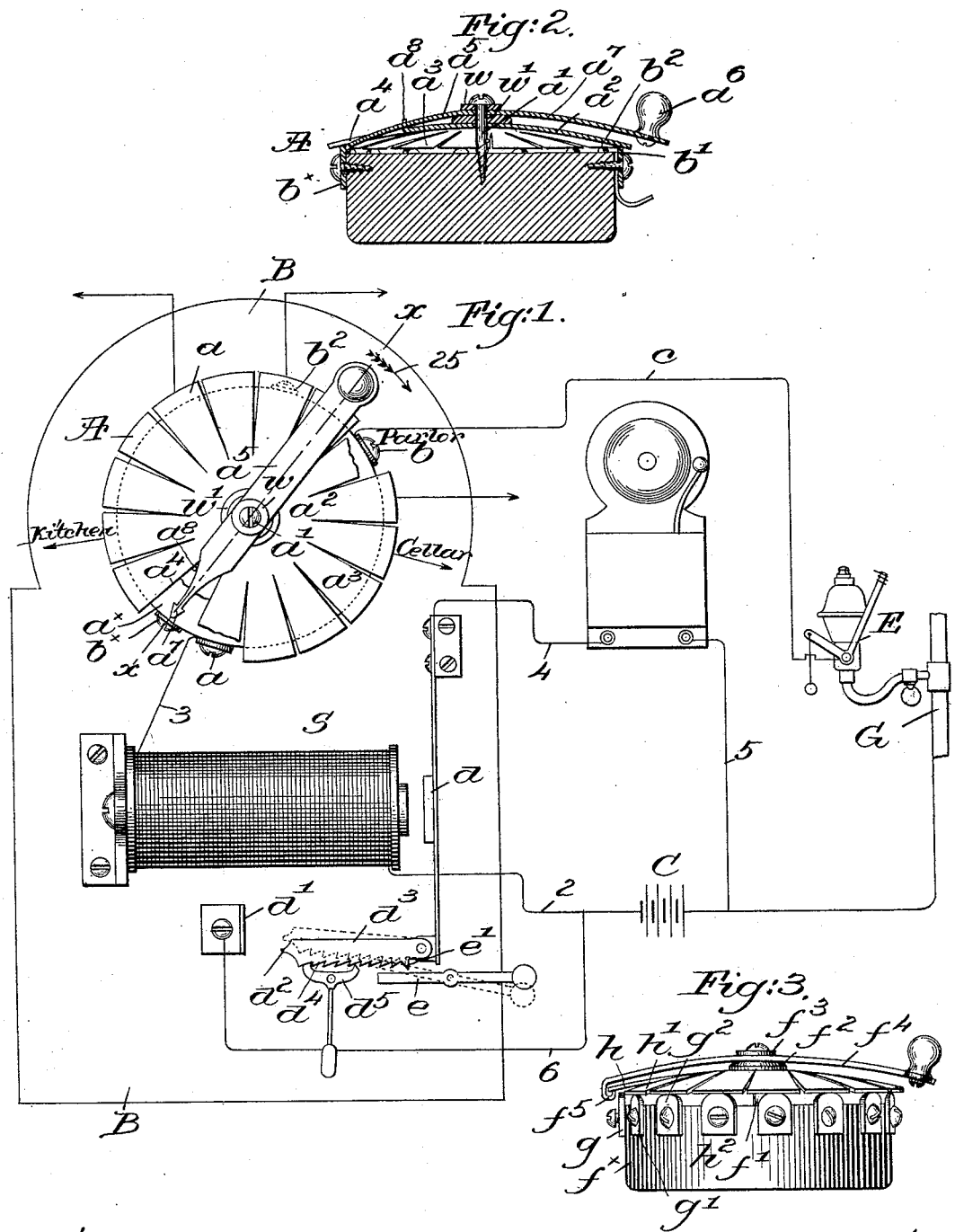
Witnesses.
Edward F. Allen
Thomas J. Drummond
Inventor,
George A. O'Neill.
By Crosby & Gregory
attys.

UNITED STATES PATENT OFFICE.

GEORGE A. O'NEILL, OF BOSTON, MASSACHUSETTS.

TESTING DEVICE FOR ELECTRIC CIRCUITS.

SPECIFICATION forming part of Letters Patent No. 523,865, dated July 31, 1894.

Application filed October 20, 1893. Serial No. 488,733. (No model.)

*To all whom it may concern:*

Be it known that I, GEORGE A. O'NEILL, of Boston, county of Suffolk, State of Massachusetts, have invented an Improvement in Testing Devices for Electric Circuits, of which the following description, in connection with the accompanying drawings, is a specification, like letters and figures on the drawings representing like parts.

In the use of electric gas-lighting systems, and in electric call bell systems, considerable difficulty often arises from faulty circuits, caused by improper insulation and short-circuiting, grounding of the circuits, the sticking of the electrodes at the burners, and other causes. Inconvenience and trouble arise for the want of a quick and convenient device for locating the faulty circuit, and, when found for cutting it out, so that waste of the battery will be prevented.

Devices for obviating the foregoing objections have been constructed, but they are slow and cumbersome in operation, or require skill and experience to operate them properly and satisfactorily.

This invention has for its object the production of a testing device for such circuits of simple construction, rapid and effective operation, and adapted to be readily manipulated by any person.

In accordance therewith my invention consists in a series of normally-open main circuits, manually operated closures therein, a series of contacts to which one terminal of each circuit is connected, a local alarm circuit responsive to an abnormal closure of any of said main circuits, a slitted contact plate co-operating with said series of contacts, and a generator in electrical connection with said plate and thereby normally in circuit with said main circuits, combined with a common manually operated circuit breaker adapted to interrupt said main circuits one at a time and successively at the points of connection of the contact plate and terminal contacts, interruption of the abnormally closed circuit stopping the alarm and thereby indicating the faulty circuit, substantially as will be described.

Other features of my invention will be hereinafter described and particularly pointed out in the claims.

Figure 1, represents a plan view, partly broken away, of a testing device embodying my invention, the circuits being shown in diagram. Fig. 2 is a vertical section of the test switch, taken on the line $x$—$x$ Fig. 1; and Fig. 3 is a modified form of switch to be described.

I have herein shown the working parts of the apparatus as mounted upon a suitable support B, and connected by suitable circuits, to be described, with a battery C, grounded, as herein shown by connecting it with the gas piping D, or the battery could be grounded in any other suitable manner. A sparking-coil S of usual construction, is connected with the battery C by wire 2, and with a suitable binding post $a$ of the switch A by wire 3. The switch consists of a base $a^x$, of suitable insulating material, upon which are arranged a series of contacts, shown as binding posts $b$, $b'$, $b^2$, &c., to which the terminals of all the wires leading from the gas-burners or call-bells are connected, and as herein shown, one of the binding posts, as $b$, is connected by wire $c$ with one electrode of an electric gas-lighter E, only one of the complete circuits being shown for the sake of clearness, the other electrode of the lighter being grounded in usual manner. The base $a^x$ is preferably cylindrical in form, and the contacts are arranged upon its periphery in a circle about a post $a'$ fixed in the base, and supporting a rotatable metallic plate $a^2$, slitted radially from its periphery to form a series of like contacts $a^3$, one of said contacts being cut away, however, as at $a^4$, for a purpose to be described. The plate is convexed, as best shown in Fig. 2, and the contacts $a^3$ rest upon the binding posts with a yielding pressure, and make quick contacts therewith. An actuator, shown as an arm $a^5$, provided with a handle $a^6$ of insulating material, is pivoted on the post $a'$ and retained in position by a washer $w$, a separating washer $w'$ being interposed between the arm and plate. One end of the actuator $a^5$ is shaped as a pointer $a^7$, and a lug or projection $a^8$ on the plate $a^2$ adjacent the cut away portion $a^4$ bears against the actuating arm, whereby rotation of the latter in the direction of the arrow 25, Fig. 1, will rotate the contact plate $a^2$.

Referring to Fig. 1, it will be seen that the pointer $a^7$ of the actuator is held by the lug $a^8$ above the cut away portion $a^4$, and that the binding post which is opposite said cut away part will not contact with the plate $a^2$, thus making said plate a circuit breaker common to all the contacts $b$, $b'$, &c.

When the switch is in the position shown, all the circuits will be connected, by the contact plate $a^2$ and binding posts, to the spark coil S by the wire 3 and binding post $a$, the binding post $b^\times$ which is opposite the cut away part of the contact plate being unconnected with any circuit, or it may be with a normally unused one, and the gas-lighting device or push-button in any of the circuits may then be operated in usual manner. The circuit leading from contact $b^\times$ if there be one, will be normally inoperative, as it is cut out from the spark coil at said post.

The spark coil S is provided with a normally retracted amature $d$, in a local bell-circuit, 4, 5, 6, connected to the poles of the battery C, one end of wire 6 terminating in a contact $d'$ a co-operating contact $d^2$ forming part of a retarding device carried by the armature.

I have herein shown the retarding device as consisting of an arm $d^3$ pivotally connected to the armature $d$, and toothed at $d^4$ to engage a pendulum escapement $d^5$, pivoted to the support B.

As is well understood, the spark-coil is momentarily energized whenever one of the circuits of the system is closed, at a gas-burner or push-button, for instance, at such time attracting its armature $d$. The retarding device, however, retards or delays the movement of the armature to such an extent that the coil is demagnetized before the armature is attracted sufficiently to bring the contacts $d'$ and $d^2$ into engagement, to thereby close the local bell-circuit and sound an alarm, and the armature returns to its normal position.

Were it not for the retarding device the local circuit would be closed and the alarm sounded every time one of the main circuits was closed, making a useless noise and expenditure of battery. Should, however, one of the main circuits be grounded or short-circuited, for any reason, as for instance, by the sticking of the gas-lighting electrodes, or by a break, a ground circuit would be completed through the battery C, and the spark coil would be energized, and so maintained until the retardation of the armature would be overcome and the contacts $d'$, $d^2$ brought into engagement, closing the local circuit and sounding the alarm, the alarm operating as long as the fault in the circuit existed.

In order to discover which circuit is at fault the contact plate and common circuit breaker $a^2$ is rotated as described, until the alarm stops, such stoppage occurring the instant the cut away part $a^4$ of said plate is brought opposite the binding post contact of the faulty circuit, for the reason that at such time the said circuit is positively broken and cut out from the spark-coil and battery at its binding post. The switch may be left in such position until it is convenient to repair the faulty circuit, without interfering with or disarranging any of the other circuits.

All of the circuits may be cut out by bringing the cut away portion of the contact plate opposite the spark-coil terminal or post $a$.

If desired, the names of the localities of the different circuits may be indicated on the support B, around the switch.

A burglar alarm is often used in connection with gas-lighting systems, and I have herein provided means whereby the alarm will be sounded instantaneously when a burglar-alarm circuit is completed, and will continue to sound until positively stopped by the house-owner.

Inasmuch as the local circuit would be closed upon completion of any of the main circuits, were it not for the retarding device, it is only necessary to render the said device inoperative whenever desired, and to provide means for maintaining the local circuit closed when the armature is attracted. This I attain by pivoting a lever $e$ adjacent the under side of the arm $d^3$, so that when said lever is turned into dotted line position, Fig. 1, it will raise the arm $d^3$ into its dotted line position and out of engagement with the escapement $d^5$, as shown. With the parts in such position the armature will be attracted and the contacts $d'$, $d^2$ brought into engagement when the spark-coil is energized, as by the closing of one of the alarm circuits.

A detent $e'$ on the arm $d^3$ is engaged by the end lever $e$ when the arm has been moved far enough to bring the contacts $d'$, $d^2$ into engagement, preventing retraction of the armature and consequent stoppage of the alarm when the coil S is demagnetized.

The alarm can only be stopped by manual movement of the lever $e$ into full line inoperative position.

While the burglar alarm circuit remains closed it may be located by the switch and pointer, as described, the lever $e$ having first been returned to normal full line position, in order that the stopping of the alarm may indicate the circuit tampered with.

In the modification shown in Fig. 3 the contacts or binding posts $g$, $g'$, $g^2$, &c., are secured to the base $f^\times$ of insulating material, and a plate to form contact arms $h$, $h'$, $h^2$, &c., normally in engagement with the binding posts, is secured to a post or stud $f'$ by a washer $f^2$, and a common circuit breaker, shown as a lever $f^4$, is pivotally supported on said post $f'$, and retained thereon by a washer $f^3$. One end of the circuit breaker is bent over the periphery of the slitted plate, and then upturned to form a rounded cam-like end $f^5$, adapted to engage one after another of the contact arms as the lever $f^4$ is rotated, breaking the circuit successively at the binding post contacts.

In Fig. 3 the arm $h$ is shown as engaged and lifted by the cam end $f^5$ of the common circuit breaker, thereby separating it from its co-operating binding post contact $g$.

It will be obvious that one or the other form of switch may be used, as desired.

My invention is not restricted to the precise construction and arrangement herein shown and described, nor to the specific construction of particular parts, as the same may be modified or altered without departing from the spirit of my invention.

I claim—

1. A series of normally-open main circuits, manually operated closures therein, a series of contacts to which one terminal of each circuit is connected, a local alarm circuit responsive to an abnormal closure of any of said main circuits, a slitted contact plate co-operating with said series of contacts, and a generator in electrical connection with said plate and thereby normally in circuit with said main circuits, combined with a common manually operated circuit breaker adapted to interrupt said main circuits one at a time and successively at the points of connection of the contact plate and terminal contacts, interruption of the abnormally closed circuit stopping the alarm and thereby indicating the faulty circuit, substantially as described.

2. A series of normally-open main circuits, manually operated closures therein, a generator, a spark-coil in circuit therewith, a series of contacts between it and said main circuits, an alarm-circuit, a fixed terminal contact therefor, and an armature for said coil included in and to close the alarm-circuit, combined with a retarding device for said armature comprising an escapement, and a toothed arm carried by said armature and co-operating with the fixed contact of the alarm circuit whereby the latter responds to an abnormal closure of a main circuit, and a common circuit-breaker adapted to co-operate with any of said main circuit contacts to thereby interrupt the abnormally closed circuit and locate it by the stoppage of the alarm, substantially as described.

3. A series of normally-open grounded circuits, manually operated closures therein, a local alarm circuit, a retarding mechanism therein responsive to an abnormal closure of a grounded circuit, and comprising a pivoted toothed arm and an escapement, a generator in said local circuit, and a series of contacts between it and said grounded circuits, combined with a manually operated common circuit breaker adapted to be moved to co-operate with said contacts one after another to thereby locate and interrupt the abnormally closed circuit and at the same time restore the alarm-circuit to its normal condition, substantially as described.

4. A series of normally-open main circuits, manually operated closures therein, a local alarm-circuit, and a retarding mechanism therein normally responsive to an abnormal closure of a main circuit, combined with a manually operated actuator for and to render the retarding mechanism responsive to any closure of a main circuit, and a detent for said mechanism, whereby the alarm-circuit is maintained operative after the main circuit is re-opened, substantially as described.

5. A series of normally-open circuits, closures therein adapted to be manually operated, a local alarm-circuit, a circuit closer in said alarm circuit responsive to any closure of a main circuit, a detent forming a part of the movable member of said circuit-closer, and controlling means adapted to be manually moved into or out of the path of movement of the detent, to thereby maintain the alarm-circuit closed after responding to a main circuit closure, or to permit free return movement of the circuit closer into normal position after a main line closure, substantially as described.

6. A series of main circuit terminal contacts, an insulating base to which they are secured, a generator, and a radially slitted contact plate in circuit therewith and with said series of terminal contacts, combined with a manually operated common circuit breaker adapted to be moved to co-operate with said contacts one by one successively to thereby cut out any desired one of the corresponding main circuits at will, substantially as described.

In testimony whereof I have signed my name to this specification in the presence of two subscribing witnesses.

GEORGE A. O'NEILL.

Witnesses:
JOHN C. EDWARDS,
FREDERICK L. EMERY.